United States Patent
von Berg

(10) Patent No.: US 10,684,144 B2
(45) Date of Patent: Jun. 16, 2020

(54) POSITION MEASURING DEVICE AND METHOD FOR OPERATING A POSITION MEASURING DEVICE

(71) Applicant: DR. JOHANNES HEIDENHAIN GmbH, Traunreut (DE)

(72) Inventor: Martin von Berg, Übersee (DE)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 184 days.

(21) Appl. No.: 15/808,127

(22) Filed: Nov. 9, 2017

(65) Prior Publication Data

US 2018/0136015 A1 May 17, 2018

(30) Foreign Application Priority Data

Nov. 14, 2016 (DE) .......................... 10 2016 222 275

(51) Int. Cl.
*G01D 5/244* (2006.01)
*G01D 1/18* (2006.01)
(Continued)

(52) U.S. Cl.
CPC .......... *G01D 5/24476* (2013.01); *G01D 1/18* (2013.01); *G01D 5/24466* (2013.01); *G01D 5/347* (2013.01); *G01D 18/00* (2013.01)

(58) Field of Classification Search
CPC ........... G01D 5/24476; G01D 5/24466; G01D 5/347; G01D 1/18; G01D 18/00
See application file for complete search history.

(56) References Cited

U.S. PATENT DOCUMENTS 5,726,445 A * 3/1998 Thaler .................... G01D 5/366
250/231.16
7,826,106 B2 11/2010 Reusing
(Continued)

FOREIGN PATENT DOCUMENTS

DE 10 2006 012074 A1 9/2007
DE 102010061737 A1 5/2012
EP 1302753 A1 4/2003

OTHER PUBLICATIONS

European Search Report issued in European Patent Application No. 17 18 9395, dated Mar. 16, 2018 (2 pages).

*Primary Examiner* — Bryan Bui
(74) *Attorney, Agent, or Firm* — Hunton Andrews Kurth LLP

(57) ABSTRACT

A position measuring device includes: a graduation carrier on which a measuring graduation is provided; a scanning unit for generating position-dependent scanning signals by scanning the measuring graduation; and a signal processing unit for processing the scanning signals into position signals. A monitoring unit is provided, to which at least one signal to be monitored is supplied, and by which a modification signal is able to be output to a modification unit based on the monitoring of the signal to be monitored. At least one position signal is supplied to the modification unit, and the position signal is able to be modified by the modification unit for the transmission of at least one status report and able to be output as output signal to subsequent electronics. The modification is implemented based on the modification signal by adding a disturbance variable to the at least one position signal.

13 Claims, 12 Drawing Sheets

(51) Int. Cl.
*G01D 18/00* (2006.01)
*G01D 5/347* (2006.01)

(56) References Cited

U.S. PATENT DOCUMENTS

| | | |
|---|---|---|
| 9,766,097 B2 * | 9/2017 | Joachimsthaler .... G01D 5/2457 |
| 2005/0072016 A1 | 4/2005 | Strasser et al. |
| 2014/0303923 A1 | 10/2014 | Friend |

* cited by examiner

POSITION MEASURING DEVICE AND METHOD FOR OPERATING A POSITION MEASURING DEVICE

CROSS-REFERENCE TO RELATED APPLICATIONS

The present application claims priority to Application No. 10 2016 222 275.9, filed in the Federal Republic of Germany on Nov. 14, 2016, which is expressly incorporated herein in its entirety by reference thereto.

FIELD OF THE INVENTION

The present invention relates to a position measuring, and to a method for operating a position measuring device, which allows incremental position measuring devices to signal status information to a subsequent electronics.

BACKGROUND INFORMATION

Incremental position measuring devices are used in the automation technology sector and, in particular, in machine tools for the purpose of measuring positional changes of mobile parts. For example, incremental rotary encoders measure rotatory movements, e.g., of rotating shafts. Incremental linear encoders, on the other hand, measure linear displacements of machine parts that are disposed so as to allow them to shift position relative to one another.

In conventional incremental position measuring devices, a graduation track, which is made up of code elements disposed at regular intervals, is scanned by a detector unit. A wide variety of physical scanning principles may be used for this purpose, e.g., optical, magnetic, inductive, or capacitive scanning principles. Preferably, the detector signals resulting from the scanning are largely sinusoidal at a uniform movement (constant speed, or constant rate of rotation), and the positional information may be obtained by counting the signal periods covered or additionally, if greater resolution is required, by subdividing the signal periods into a number of angular segments (interpolation). An item of directional information is able to be obtained when two detector signals are generated during the scanning that have a phase shift from each other, such as a phase shift of 90°. In order to provide an absolute reference point for the inherently relative position measurement of incremental position measuring devices, a reference pulse is frequently generated at at least one position. For this purpose, a suitable graduation structure may be disposed on a separate graduation track, which is likewise scanned by the detector unit.

The detector signals obtained by the detector unit are processed in a signal processing unit and adapted in accordance with a specification of an output interface. For example, one conventional interface for incremental position measuring devices requires a peak-to-peak value of 1V for the incremental signals.

In addition to such analog interfaces, there are also interfaces that output digital incremental signals. In this case, digital, i.e., square-wave, incremental signals are generated in the signal processing unit from the analog detector signals. Here, too, it applies that two digital incremental signals that are phase-shifted relative to each other are required for a position measurement as a function of a direction of movement.

Depending on the interface, the reference pulse is also output in an analog or digital manner.

The transmission of the (analog or digital) incremental signals as well as the reference pulse to a subsequent electronics takes place via high-quality multi-core cables that are shielded in the majority of cases. It may be carried out both with reference to mass and in a differential manner. Since quite long distances frequently have to be covered between the subsequent electronics and the position measuring devices, the cables represent a cost factor that should not be underestimated in the project development of a system. Because the number of required cores in the cable also has an effect on the price, there is a constant endeavor to keep the number of cores in the cable to a minimum.

Diametrically opposed to this endeavor is the requirement to also generate even further information in the position measuring device, in addition to the positional information, such as a status report. However, a transmission of such a status report to the subsequent electronics usually requires additional cores in the cable.

German Published Patent Application No. 10 2006 012 074 describes a position measuring device in which the status of a monitoring device is signaled by a change in the signal amplitudes of the analog position signals. However, since the amplitude of the position signals has a direct effect on the position evaluation in the subsequent electronics, the subsequent electronics may interpret this as a failure of the position measuring device, which may thus lead to a standstill of the system in which the position measuring device is operated.

SUMMARY

Example embodiments of the present invention provide a position measuring device by which status reports are able to be output to subsequent electronics in an uncomplicated manner.

According to an example embodiment of the present invention, a position measuring device includes a graduation carrier on which a measuring graduation is situated; a scanning unit for generating position-dependent scanning signals by scanning the measuring graduation; and a signal processing unit for processing the scanning signals into position signals. In addition, a monitoring unit is provided, to which at least one signal to be monitored is supplied and by which a modification signal is able to be output to a modification unit based on the monitoring of the signal to be monitored. At least one position signal is supplied to the modification unit, and the position signal is able to be modified by the modification unit for the transmission of at least one status report, and to be output as an output signal to a subsequent electronics. The modification based on the modification signal takes place by adding a disturbance variable to the at least one position signal.

Furthermore, example embodiments of the present invention provide a method by which status reports are able to be output to subsequent electronics in an uncomplicated manner.

According to an example embodiment of the present invention, a method is provided for outputting a status report using a position measuring device. The position measuring device includes a graduation carrier on which a measuring graduation is provided, a scanning unit for generating position-dependent scanning signals by scanning the measuring graduation, and a signal processing unit for processing the scanning signals into position signals. A monitoring unit is provided, to which at least one signal to be monitored is supplied, and by which a modification signal is output to a modification unit based on the monitoring of the signal to be monitored. At least one position signal is supplied to the modification unit, and the position signal is modified by the modification unit for the transmission of the at least one status report and output as an output signal to subsequent electronics. The at least one position signal is modified by adding a disturbance variable based on the modification signal.

Further features and aspects of example embodiments of the present invention are described in more detail below with reference to the appended Figures.

DETAILED DESCRIPTION

Figure 1:
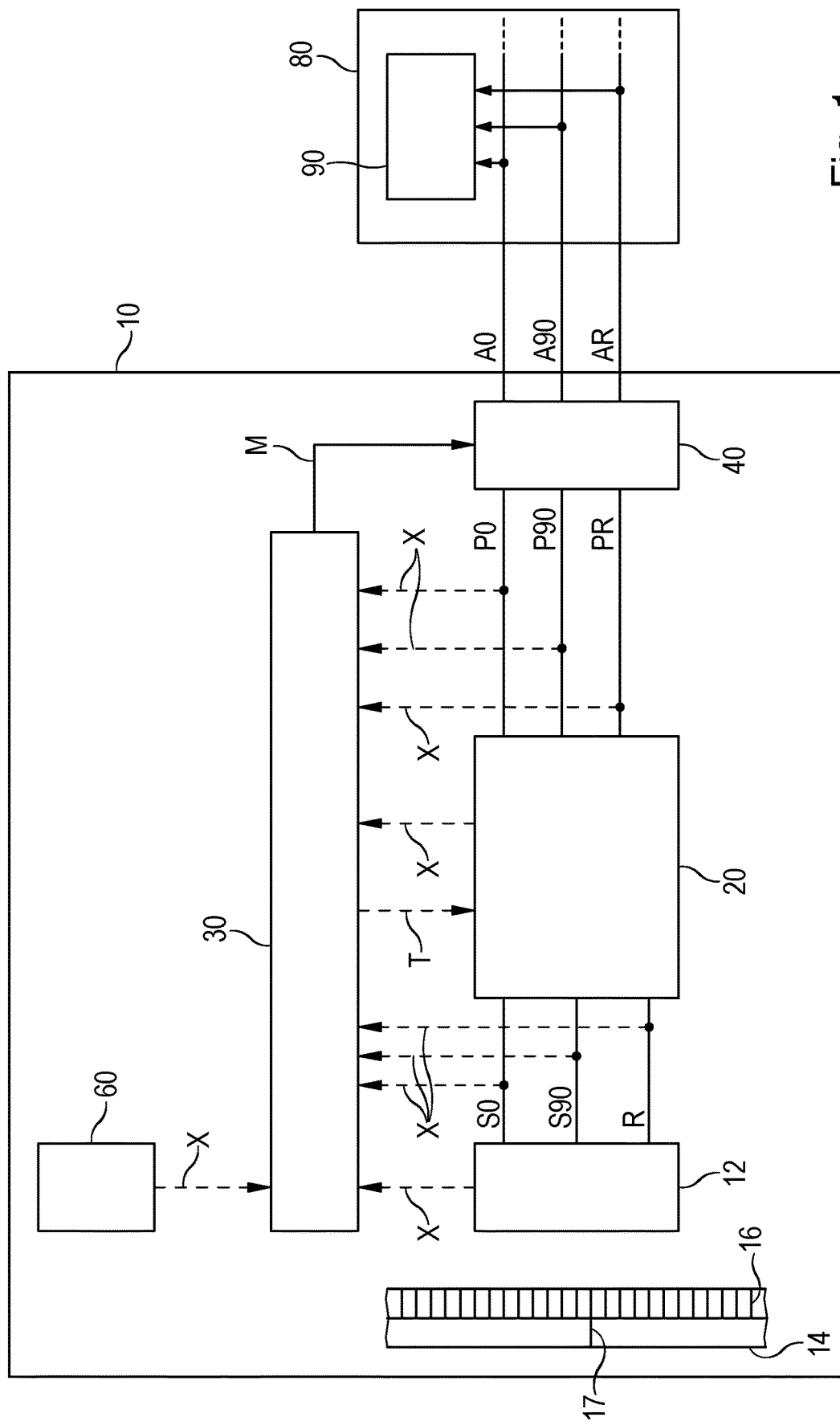
FIG. 1 is a block diagram of a position measuring device according to an example embodiment of the present invention.

FIG. 1 is a block diagram of a position measuring device 10 according to an example embodiment of the present invention. It includes a scanning unit 12, which is appropriately adapted to scan a measuring graduation on a graduation carrier 14. In the generally conventional manner, graduation carrier 14 and scanning unit 12 are disposed so as to allow movements relative to each other, for instance by being connected to mobile parts of a machine tool, whose relative position with respect to each other is to be determined.

In addition to the schematically illustrated exemplary embodiment for detecting linear relative positions, rotatory position measuring devices may also be provided. In this case, the graduation carrier is not arranged as a straight measuring scale but as a circular disk, for example, in which the measuring graduation is disposed radially around the disk's center point (which during the operation forms the pivot point of an axis whose angular position or rate of rotation is to be measured).

In the illustrated example, the measuring graduation includes an incremental graduation track 16 and a reference graduation track 17. The scanning of measuring graduation 16, 17 results in scanning signals S0, S90, R, which include two incremental signals S0, S90 that are shifted in phase by 90°, from scanning incremental graduation track 16, as well as a reference signal R from scanning reference graduation track 17. Incremental signals S0, S90 are largely sinusoidal at a uniform movement (corresponding to a constant speed) of the measuring graduation relative to scanning unit 12. Reference signal R is used to supply an absolute reference position for the inherently relative position measurement of the incremental position measuring device. To do so, a pulse is generated as a reference signal R at a defined position (or at a defined angular position in the case of an angle measuring device).

However, it should be understood that the foregoing example of a scanning principle for the generation of scanning signals that include an item of positional information is not considered restrictive. Instead, it is independent of the physical scanning principle (e.g., optical, magnetic, inductive, capacitive scanning, etc.) and the manner in which the positional information is included in the scanning signals. For example, amplitude-modulated or digitally encoded scanning signals are also suitable.

Scanning signals S0, S90, R are supplied to a signal processing unit 20, which is adapted to process them into position signals P0, P90, PR of an incremental interface of position measuring device 10. Depending on the scanning principle and the encoding of the positional information in the scanning signals resulting therefrom, a variety of processing steps may be carried out in signal processing unit 20, for example: conversion of current signals into voltage signals; demodulation; filtering; A/D conversion; error correction (e.g., offset correction, phase correction, etc.); adaption of the number of signal periods per linear or angle unit; D/A conversion; etc.

In this particular example, the position signals resulting from the processing include two incremental position signals P0, P90 and a reference pulse PR. As illustrated in the following examples, the position signals P0, P90, PR may be analog signals. However, it is also possible that the signals are present in digital form.

Position signals P0, P90, PR are forwarded to a modification unit 40, which in turn emits output signals to a subsequent electronics 80 connected to position measuring device 10. Similar to the position signals, the output signals include two incremental output signals A0, A90, as well as an output reference pulse AR. Output signals A0, A90, AR thus form the signal interface of position measuring device 10.

A monitoring unit 30 is provided to monitor function units of position measuring device 10. It is adapted to monitor at least one function parameter of position measuring device 10. Examples for function parameters to be monitored include: amplitudes of the scanning signals; offset of incremental signals S0, S90; phase position of incremental signals S0, S90 relative to one another; position of reference signal R relative to incremental signals S0, S90; status signals of scanning unit 12; status signals of signal processing unit 20; amplitudes of position signals P0, P90, PR; offset of position signals P0, P90, PR; phase position of incremental position signals P0, P90 relative to one another; position of reference pulse PR relative to position signals P0, P90; sensor values of an internal sensor 60 (e.g., temperature, vibrations, supply voltage); results of self-test functions of position measuring device 10 (built-in-self test, BIST); etc.

Signals X to be monitored accordingly are supplied to monitoring unit 30. The monitoring is performed by a comparison with expected or limit values, and test signals T are able to be output to units to be monitored (e.g., signal processing unit 20), as the case may be, in order to initiate self-test functions, the result of which is supplied to monitoring unit 30 in the form of a signal X to be monitored.

To transmit an item of status information resulting from the monitoring to subsequent electronics 80, monitoring unit 30 outputs a corresponding modification signal M to modification unit 40, which initiates the transmission of a status report to subsequent electronics 80. The signaling is performed by adding a disturbance variable to at least one of the position signals P0, P90, PR in modification unit 40, i.e., such that resulting output signals A0, A90, AR continue to be able to be evaluated, so that the operation of position measuring device 10 on subsequent electronics 90 continues to be ensured. Especially suitable disturbance variables are a signal offset and/or a phase shift of the signals relative to one another.

On the receiving side, i.e., on the side of subsequent electronics 80, a monitoring unit 90 is provided to which at least position signals P0, P90, PR that are used for the transmission of status reports are supplied. Receiving-side monitoring unit 90 is adapted to detect the added disturbance variables, recognizing the transmitted status report, and initiating suitable measures such as the output of a warning message or the controlled switch-off of the machine. As illustrated in FIG. 1, receiving-side monitoring unit 90 may be arranged within subsequent electronics 80 but may also involve a separate unit.

This procedure is based on the understanding that the output signals of modern position measuring devices are able to be generated very accurately in the signal processing unit, while even signals that deviate widely from the ideal values of the signal interface are still able to be evaluated in the subsequent electronics. In other words, the output signals observe much narrower tolerances than demanded by the subsequent electronics.

According to one example in this context, in a conventional interface of incremental position measuring devices, the incremental position signals have a peak-to-peak value of 1V. Given a constant rate of movement (rate of rotation), the signals are largely sinusoidal and are arranged symmetrically around a reference potential (most often ground potential 0V). The phase shift between the incremental position signals amounts to 90°. Reference pulse PR is symmetrical, and its maximum lies at a position at which the incremental position signals have positive values and the same instantaneous value.

The subsequent electronics, on the other hand, is able to process incremental position signals that have an offset of 100 mV or more. An evaluation of the position signals is frequently able to take place even at a deviation from the ideal phase shift by values of up to 30°. A positional offset of reference pulse PR in relation to incremental position signals P0, P90 within certain limits still allows for the secure setting of a reference point for the position measurement.

Figure 2:
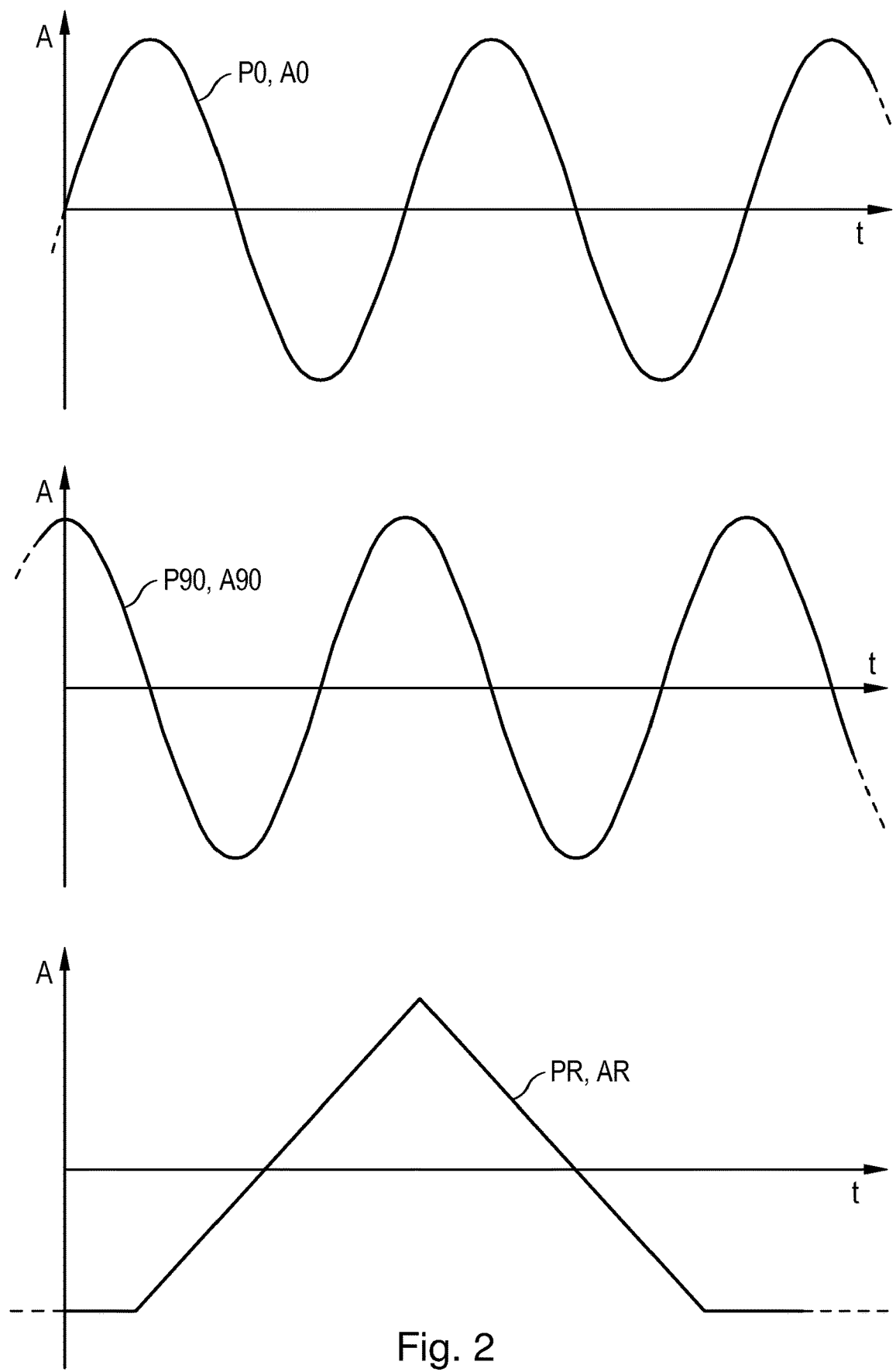
FIG. 2 is a signal diagram of position signals or output signals in a fault-free operation.

FIG. 2 is a signal diagram of position signals P0, P90, PR (or output signals A0, A90, AR) in a fault-free operation (i.e. without a transmission of a status report to subsequent electronics 80) at a constant speed. Position signals P0, P90, PR are analog, e.g., incremental position signals P0, P90 are sinusoidal, and reference pulse PR also shows an analog characteristic with a defined maximum value. In comparison, if position signals P0, P90, PR were present in digital form, then incremental position signals P0, P90 would be square-wave signals, and reference pulse PR would be a digital pulse having a defined duration and position with reference to incremental position signals P0, P90. All of the following examples are applicable both to analog and digital position signals P0, P90, PR.

Figure 3:
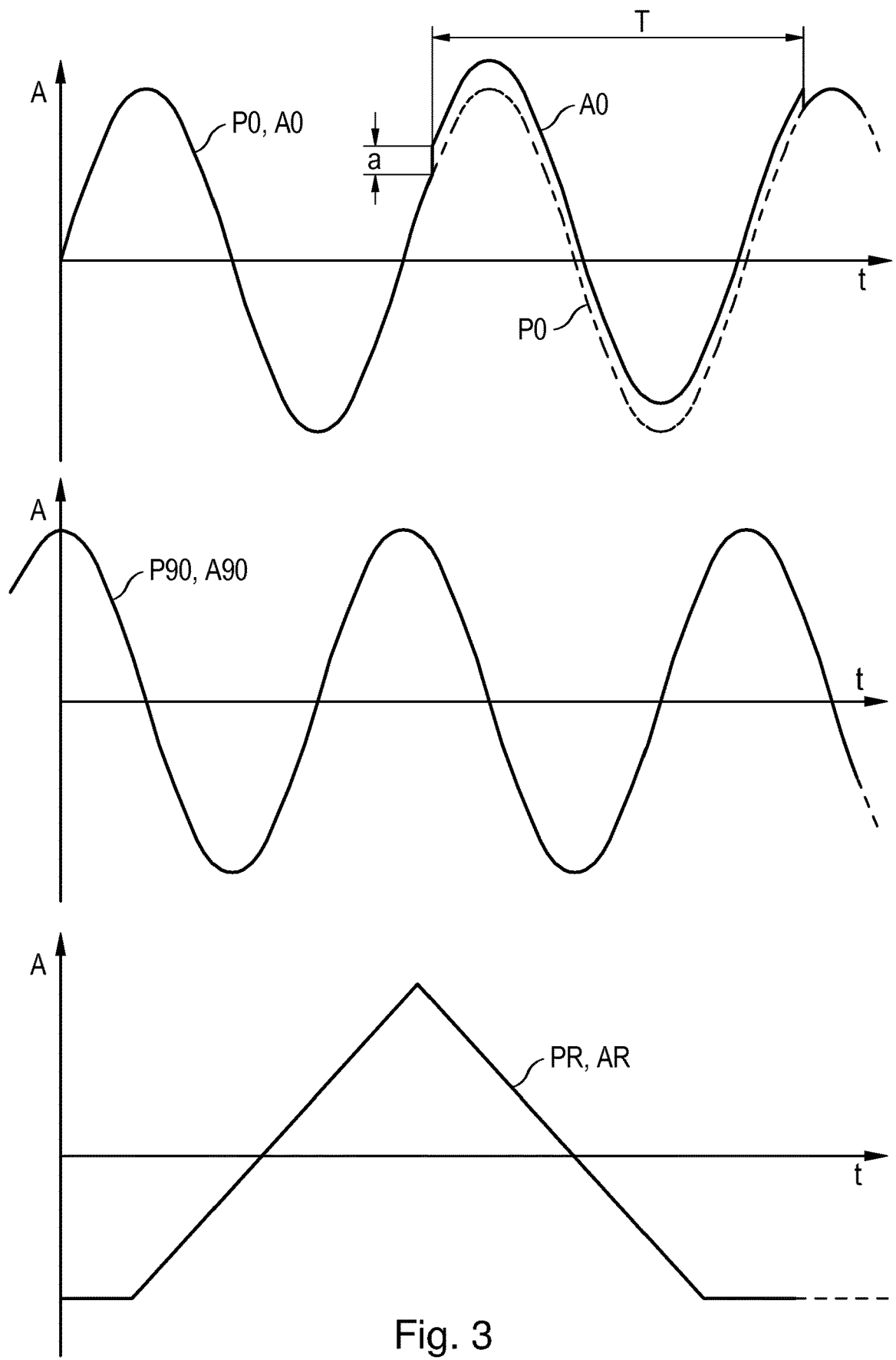
FIG. 3 is a signal diagram of a first variant for transmitting a status report to the subsequent electronics.

FIG. 3 is a signal diagram of a first variant for transmitting a status report to subsequent electronics 80, using the example of position signal P0 or output signal A0. The disturbance variable used for transmitting the status report is the signal offset. In other words, an offset voltage a is added to position signal P0 for a time period T, so that output signal A0 is shifted by offset voltage a during this time period. On the part of subsequent electronics 80, this abrupt change in output signal A0 is able to be detected by the receiver-side monitoring unit, meaning that the status report is able to be processed.

In this particular example, the status report is output temporarily for time period T. Different status reports are able to be differentiated by: time period T; the amount of offset voltage a; the polarity of offset voltage a; etc.

These differentiation variables are also combinable.

In addition, status reports are able to be transmitted in encoded form by multiple additions of an offset voltage a taking place consecutively in time. This corresponds to a serial transmission of the status report. In the same manner, a plurality of output signals A0, A90, AR may be utilized for transmitting a status report.

Figure 4:
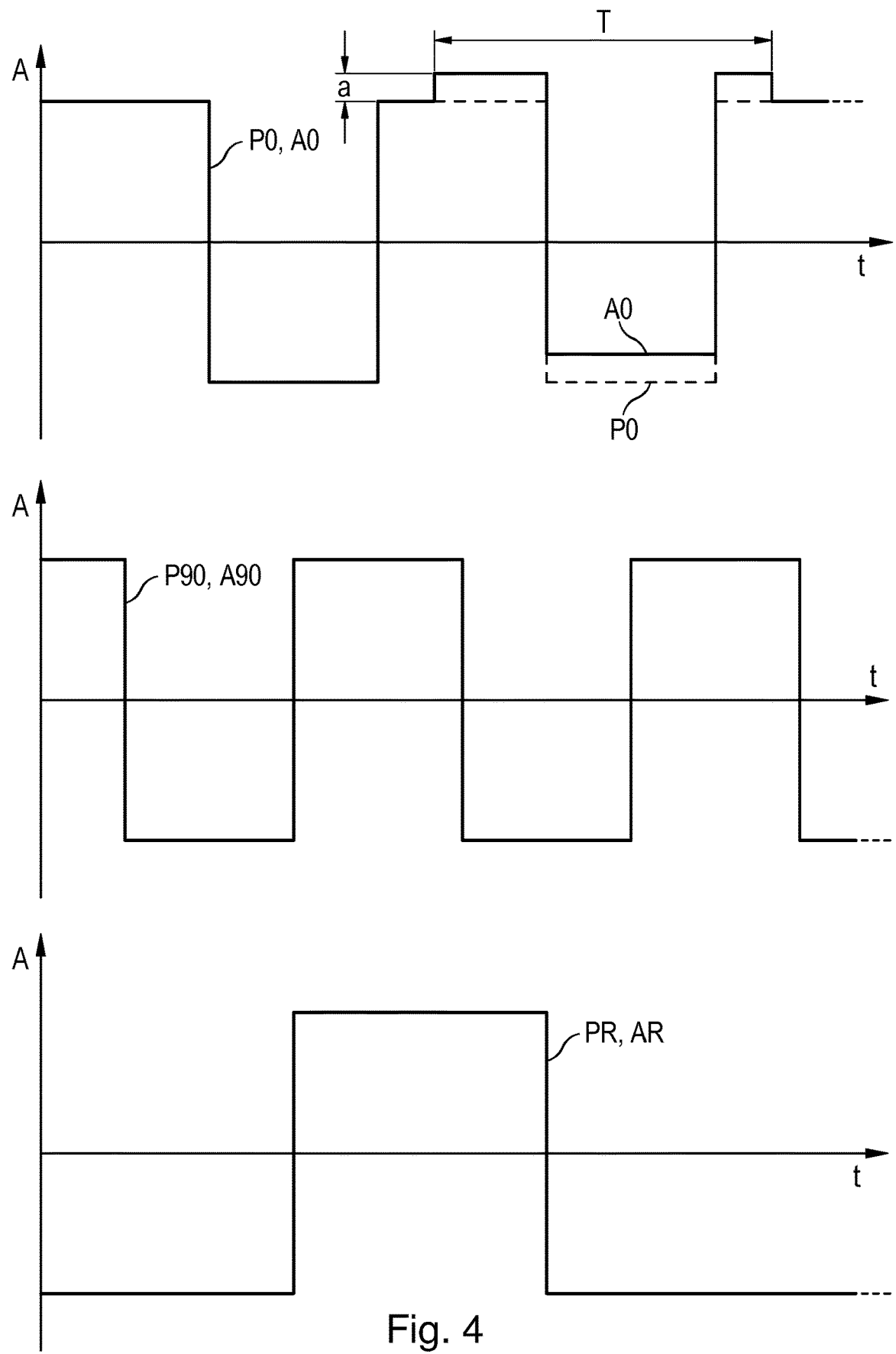
FIG. 4 is a signal diagram of the first variant with square-wave output signals.

FIG. 4 is a signal diagram of the variant from FIG. 3 in the event that position measuring device 10 outputs digital (square-wave) output signals.

Figure 5:
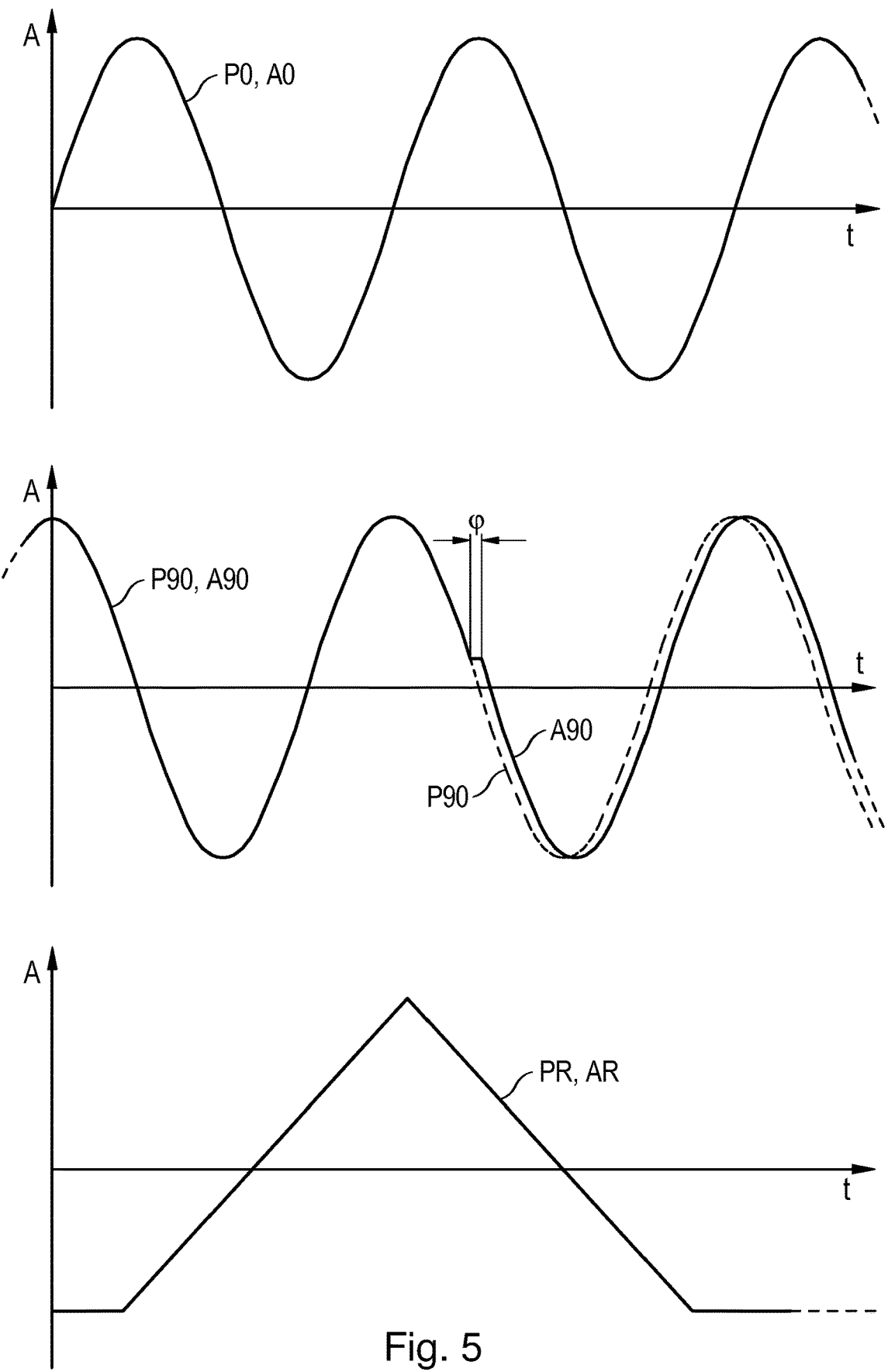
FIG. 5 is a signal diagram of a second variant for transmitting a status report to the subsequent electronics.

FIG. 5 is a signal diagram of a second variant for transmitting a status report to subsequent electronics 80, using position signal P90 or output signal A90 as the example. The disturbance variable that is used for transmitting the status report in this instance is the phase position, meaning that one of the incremental position signals (in the example, position signal P90) is shifted by an error angle $\varphi$, so that the phase shift of output signals A0, A90 now amounts to 90°+$\varphi$. The change in the phase shift is once again detectable by receiving-side monitoring unit 90.

Different status reports may be distinguished by, for example: the time duration of the phase shift by error angle $\varphi$; the absolute amount of error angle $\varphi$; or the algebraic sign of error angle $\varphi$.

The foregoing variables are combinable, and status reports are able to be serially encoded, and/or transmitted using a plurality of output signals.

Figure 6:
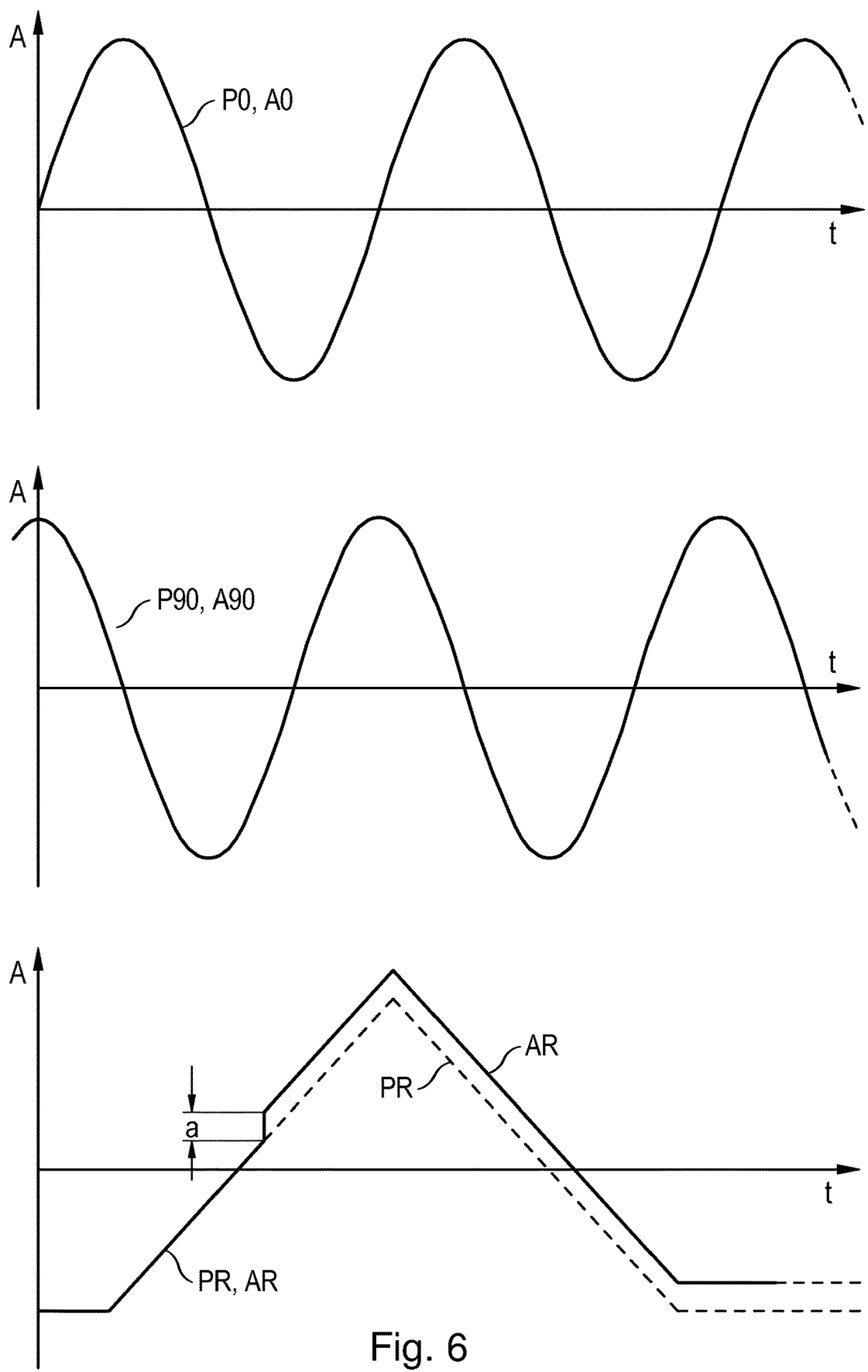
FIG. 6 is a signal diagram of an additional variant for transmitting a status report to the subsequent electronics.

FIG. 6 is a signal diagram of a further variant for transmitting a status report. Here, the signal of reference pulse PR, or output reference pulse AR, is used for transmitting the status report, i.e., by adding an offset voltage a, similar to the example illustrated in FIG. 3.

In the same manner, it is possible to shift reference pulse PR by an error angle $\varphi$ for transmitting a status report, similar to the example illustrated in FIG. 5. In this case, it should be taken into account that the transmission of a status report requires a reference pulse RP (and thus passing over a reference mark of reference graduation track 17 by scanning unit 12). The addition of an offset voltage a is therefore the preferred option in the event that a status report must be transmitted immediately or in a standstill.

Figure 7:
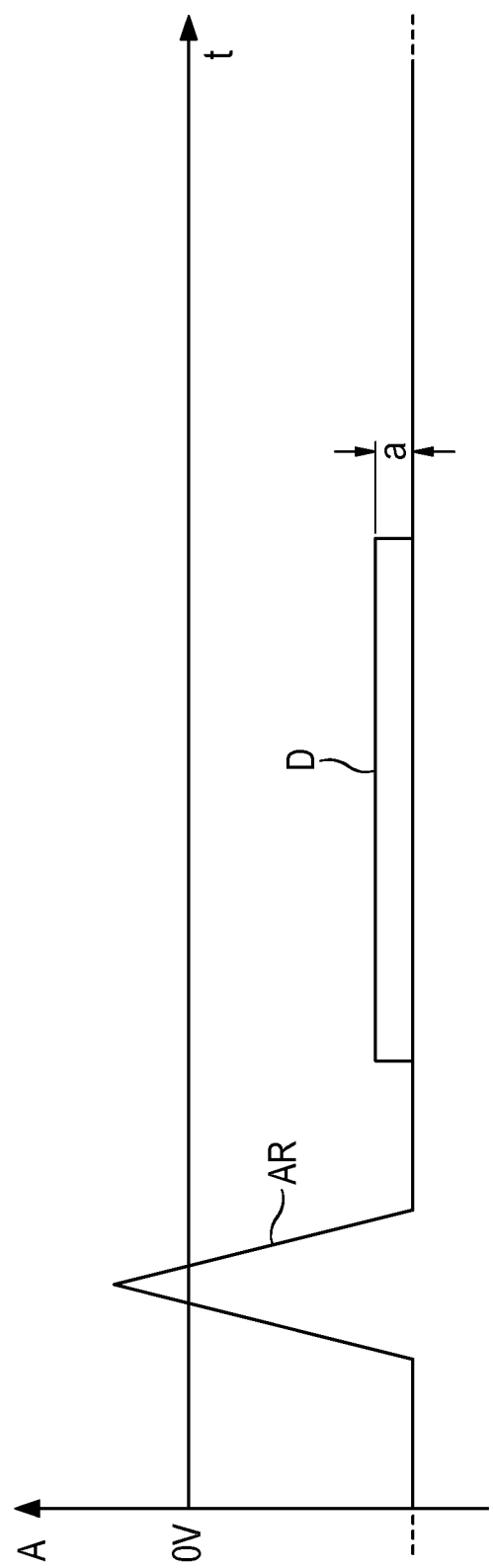
FIG. 7 is a signal diagram of a further variant for transmitting a status report to the subsequent electronics.

FIG. 7 is a signal diagram of a further variant for transmitting a status report. Here, too, the signal of reference pulse PR, or output reference pulse AR, is used for transmitting the status report. In a further development of the variant according to FIG. 7, the transmission of the status report takes place in the form of a digital data word D, which has a plurality of bits. For example, a bit of the data word may be encoded by an addition (logical "1") or non-addition (logical "0") of an offset voltage a. The transmission may take place in a time period during which no reference pulse PR, or output reference pulse AR, is output and the transmitted signal level remains below a detection threshold of subsequent electronics 90. A detection threshold is a signal level at which subsequent electronics detects output reference pulse AR, such as 0V. Data words of conventional serial interfaces may be used as an example for constructing data word D.

Figure 8:
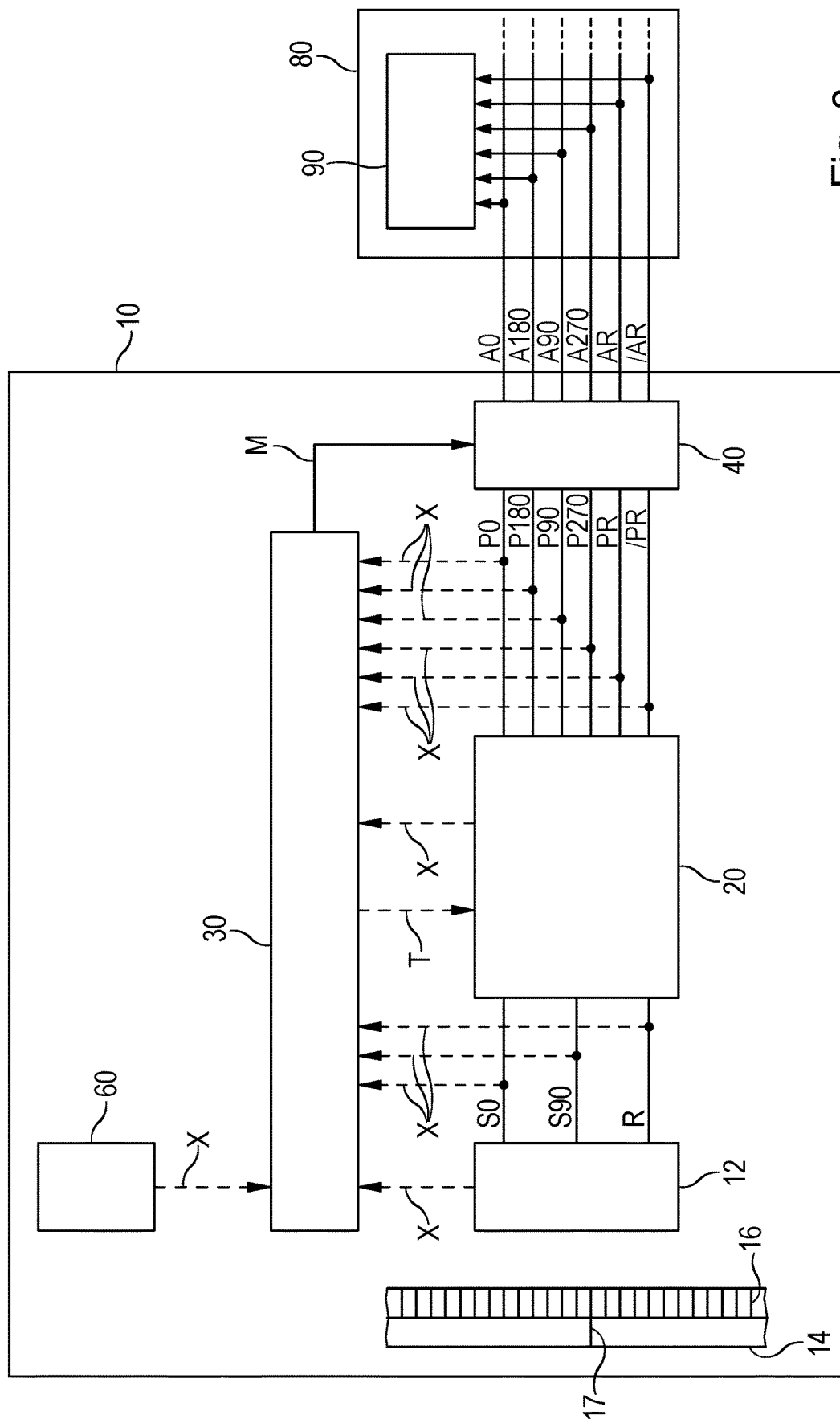
FIG. 8 is a block diagram of a position measuring device according to another example embodiment of the present invention.

FIG. 8 is a block diagram of a further position measuring device 10 according to an example embodiment of the present invention. Components described with reference to FIG. 1 are provided with the same reference numeral. In a deviation from FIG. 1, output signals A0, A90, A180, A270, AR, /AR are transmitted in a differential manner in this exemplary embodiment, meaning that a further output signal having an inverse characteristic exists for each output signal.

Figure 9:
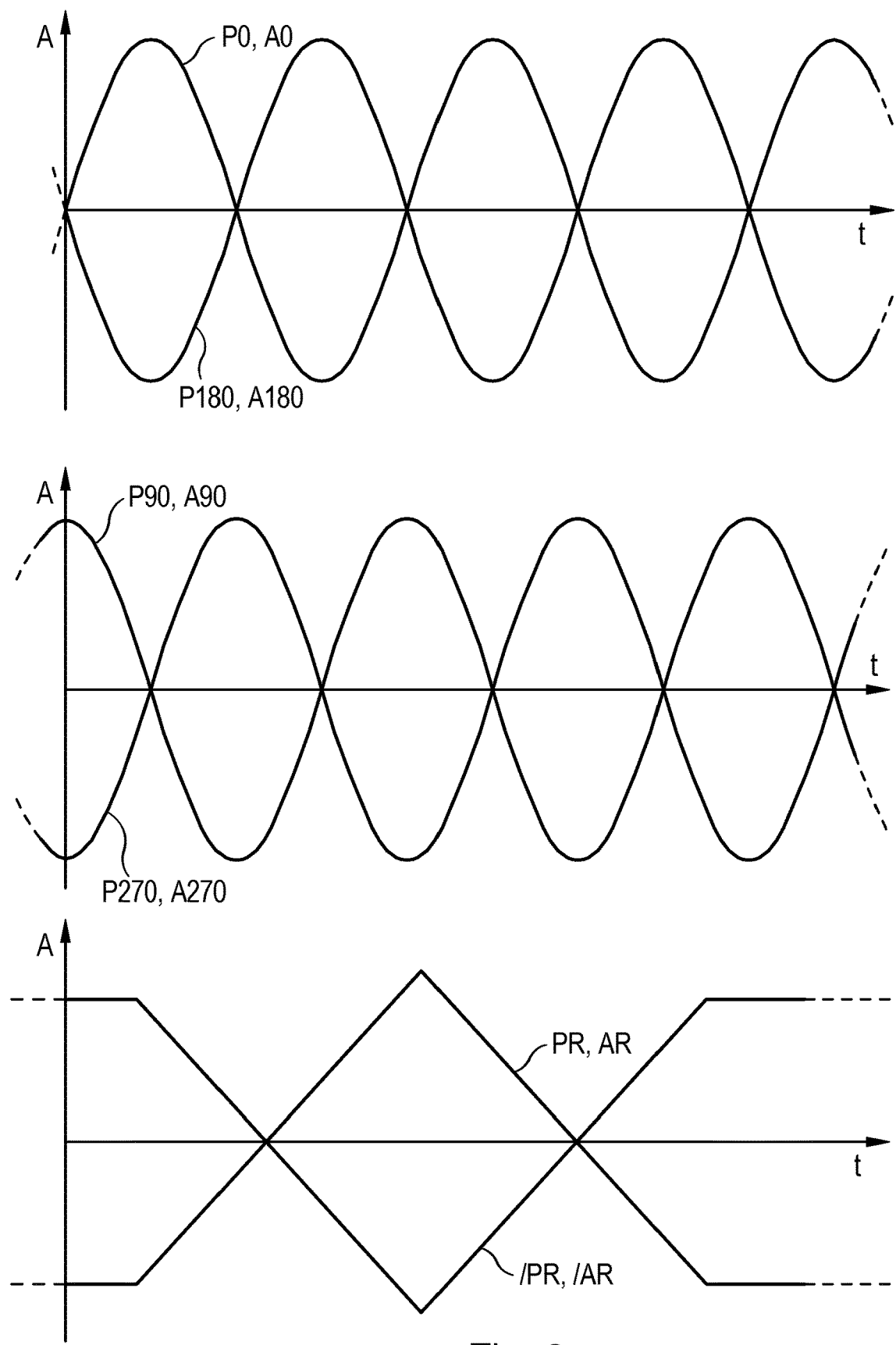
FIG. 9 is a signal diagram of the position signals and output signals of the position measuring device illustrated in FIG. 8.

FIG. 9 is a signal diagram of output signals P0, P90, P180, P270, PR, /PR (and the output signals A0, A90, A180, A270, AR, /AR) in the fault-free operation (i.e. without transmitting a status report to subsequent electronics 80) and at a constant speed. It involves the signal diagram of FIG. 2 expanded by the inverse signals, so that differential output signal pairs A0-A180, A90-A270, AR-/AR (resulting from corresponding position signal pairs P0-P180, P90-P270, PR-/PR) are formed.

The differential signal transmission and, above all, also the differential evaluation on the part of the subsequent electronics, are widely used in the field of automation technology because it is robust with respect to disturbance effects. The reason for this is that disturbance effects on the signal transmission lines for the most part affect both signals of a differential output signal pair equally, and as a result, the difference of the signals does not change. Twisting the signal lines of the output signal pair optimizes this behavior, so that a tight, parallel line routing is ensured.

Figure 10:
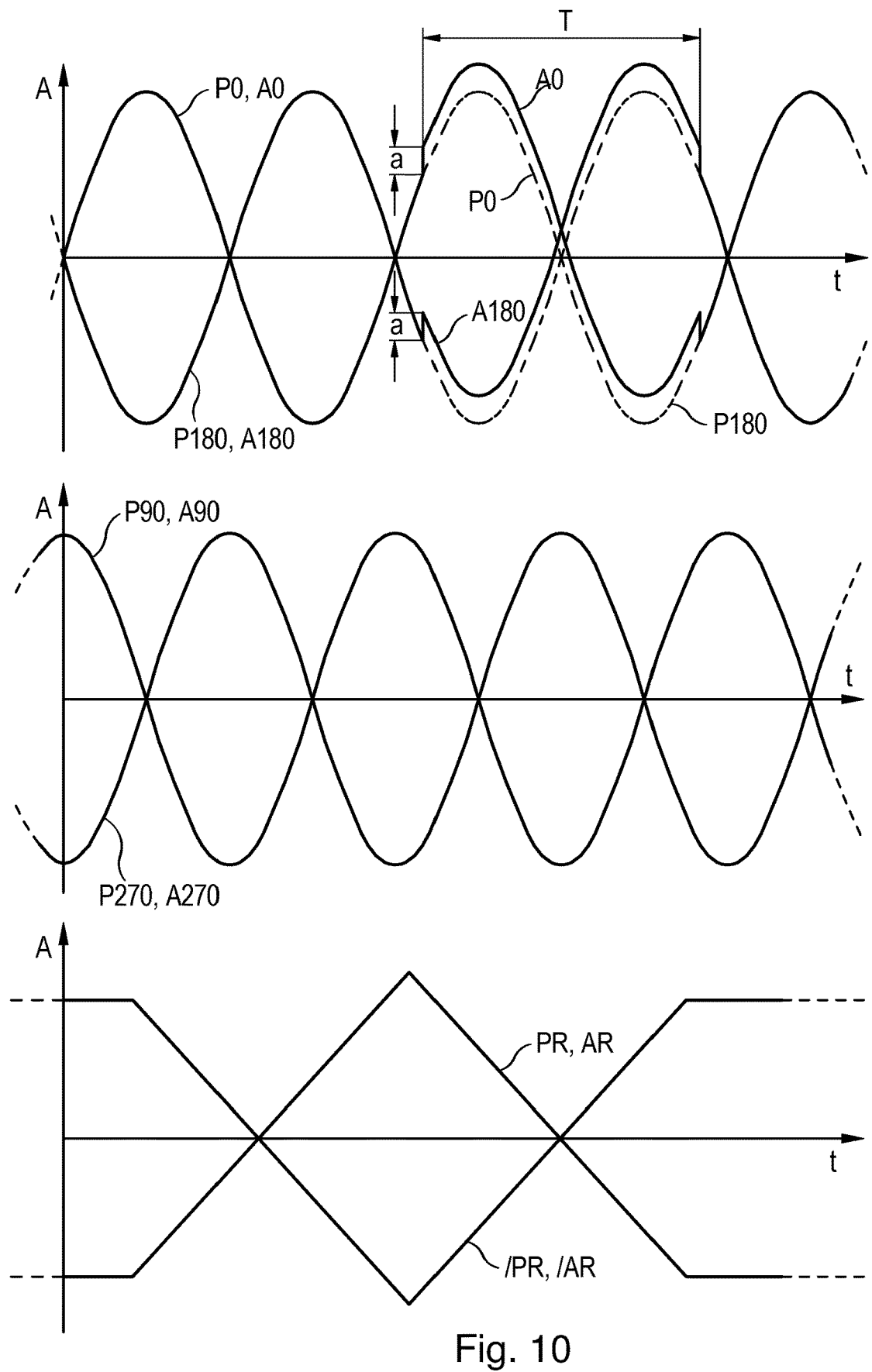
FIG. 10 is a signal diagram of a further variant for transmitting a status report to the subsequent electronics.

FIG. 10 illustrates a variant for transmitting a status report. This variant may be used when at least one differential output signal pair is present, e.g., when an inverse output signal is also transmitted for at least one output signal. Based on the signal diagram of FIG. 8, the transmission of the status report is illustrated with the aid of output signal pair P0-P180.

For the transmission of the status report, the same offset voltage a is added to both signals of differential output signal pair P0-P180. Since the difference of the signals remains unchanged in this manner, the evaluation on the part of subsequent electronics 80 is not adversely affected. Nevertheless, the abrupt change is able to be detected and evaluated in a reliable manner in receiving-side monitoring unit 90 because it is easily able to be distinguished from random disturbance effects by the defined duration and/or amplitude.

Figure 11:
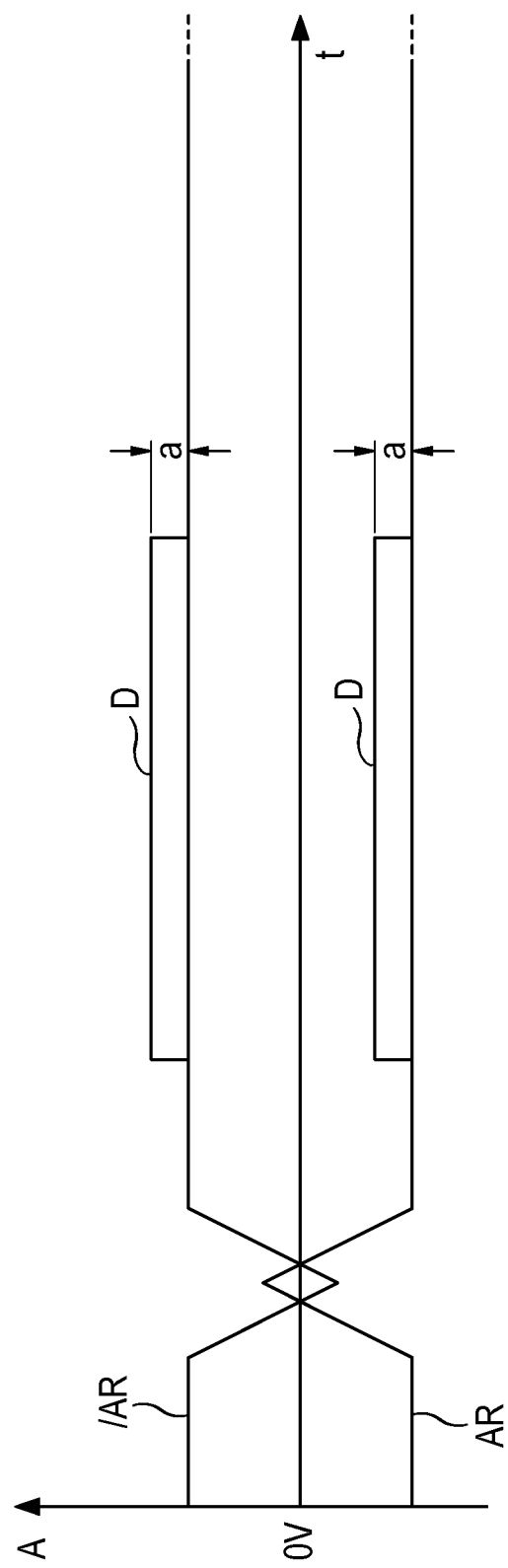
FIG. 11 is a signal diagram of a further variant for transmitting a status report to the subsequent electronics.

FIG. 11 illustrates a further variant for transmitting a status report. As in the variant described with reference to FIG. 7, the transmission of the status report takes place in the form of a data word having a number of bits that are encoded by the addition (logical "1") or non-addition (logical "0") of an offset voltage a. However, in this exemplary embodiment, the transmission takes place via a differential output signal pair that includes output reference pulse signal AR and inverted output reference pulse signal /AR, so that the advantages of the variant described with reference to FIG. 10 may also be attained.

Figure 12:
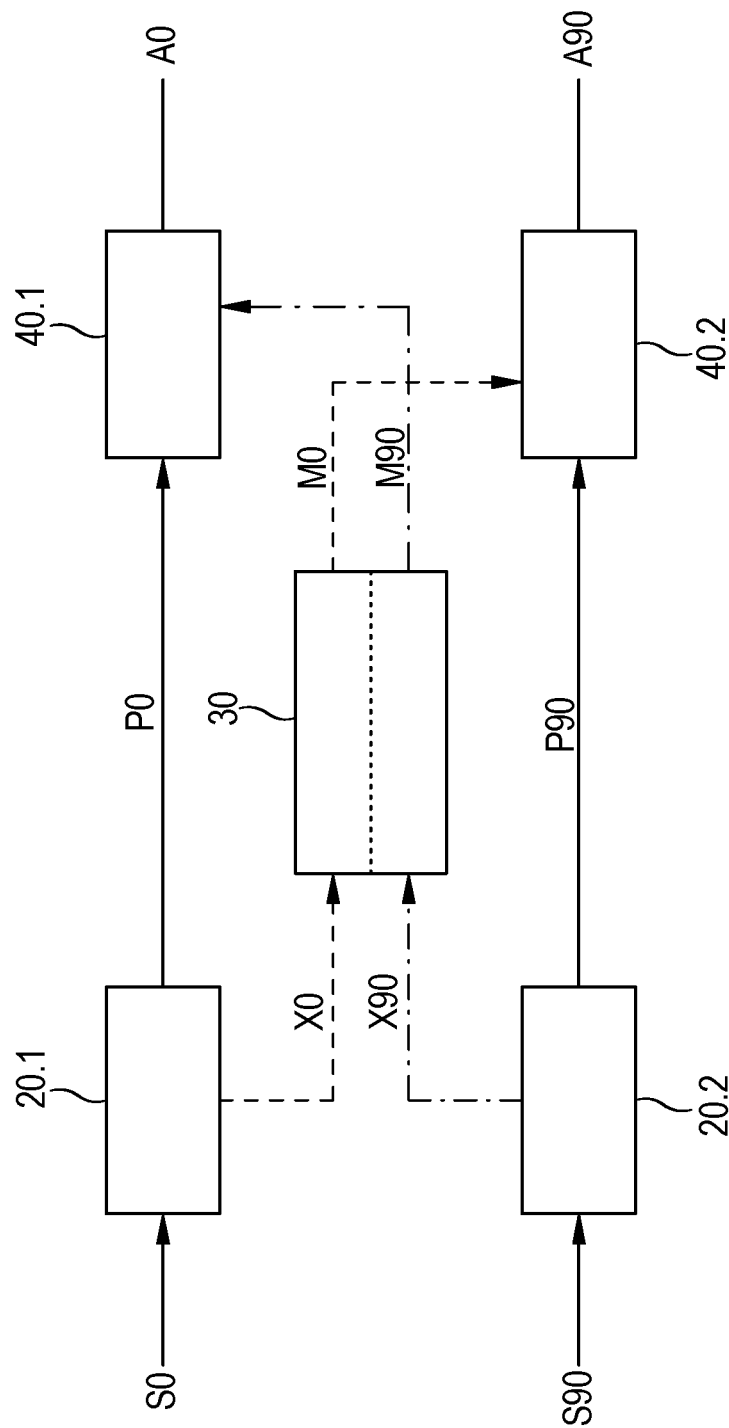
FIG. 12 is a block diagram of a position measuring device according to another example embodiment of the present invention.

FIG. 12 is a block diagram of a further, especially fault-proof embodiment of a position measuring device 10, where only the processing of scanning signals S0, S90 is shown for the sake of simplicity.

This exemplary embodiment is based on the understanding that when the event that triggers the transmission of a status report is able to be allocated to a signal path that is used for generating one of output signals P0, P90, PR, it is advantageous to select for the transmission of the status report an output signal P0, P90, PR that is generated in a different signal path. This avoids a failure in the transmission of a status report because of damage to the associated signal path.

In the example, the signal paths for processing scanning signal S0 into output signal A0, as well as the processing of scanning signal S90 into output signal A90 are carried out separately for the most part. For example, the signal path for forming output signal A0 from scanning signal S0 leads via a first part of signal processing unit 20.1 and a first part of modification unit 40.1. In a similar manner, the signal path for forming output signal A90 from scanning signal S90 leads via a second part of signal processing unit 20.2 and a second part of modification unit 40.2.

A first signal X0 to be monitored is supplied to monitoring unit 30 by the first part of signal processing unit 20.1, and a second signal X90 to be monitored is supplied to monitoring unit 30 by the second part of signal processing unit 20.2. For example, if a status report is to be output, for instance resulting from the monitoring of the first signal X0 to be monitored (and thus from the signal path for forming output signal A0), then the output of the status report takes place via the second part of modification unit 40.2 (i.e. via the signal path for forming output signal A90), controlled by a first modification signal M0 that monitoring unit 30 outputs to the second part of modification unit 40.2. The output of a status report, which results from the monitoring of the second signal X90 to be monitored (the signal path for forming output signal A90) is implemented in a similar manner, by outputting a second modification signal M90 to the first part of modification unit 40.1.

For a further improvement of the separation of the signal paths, monitoring unit 30 may also be constructed in two parts, as indicated by the dotted line.

As an alternative, the output of a status report that is based on the monitoring of the signal paths for forming incremental output signals A0, A90, may take place via the signal of output reference pulse AR, and vice versa. In this case, too, a largely separately routed signal path is used for outputting a status report.

With regard to the signal diagrams in the Figures, it should be noted that the amplitudes of position signals P0, P90, P180, P270, PR, /PR and the corresponding output signals A0, A90, A180, A270, AR, /AR are depicted in identical form merely for the sake of simplicity, but may, of course, differ.

In the same manner, it is possible to integrate modification unit 40 into signal processing unit 20 and to implement the modification (the addition of the disturbance variable) for the transmission of a status report when processing scanning signals S0, S90, R. In this case, position signals P0, P90, P180, P270, PR, /PR should be considered virtual signals.

Depending on the arrangement of signal processing unit 20 or modification unit 40, the addition of the disturbance variable to a position signal may be accomplished by analog or digital signal processing devices. For example, in case of an analog processing, a summing amplifier may be provided for adding the offset voltage to the position signal, to which the position signal to be modified and the offset voltage are supplied. In the case of digital processing, the instantaneous values of the position signal to be modified and the offset voltage are represented by digital numerical values that are added by a corresponding arithmetic circuit. The resulting numerical value is then able to be converted into the output signal by a digital-to-analog conversion.

The electronic circuit for providing the functions of position measuring device 10, in particular of signal processing unit 20, monitoring unit 30, and modification unit 40, may be integrated at least partially into an ASIC. In the same manner, function blocks are able to be provided as a program in a microcontroller, DSP or a similar device.

What is claimed is:

1. A position measuring device, comprising:
   a graduation carrier, a measuring graduation being provided on the graduation carrier;
   a scanner unit configured to generate position-dependent scanning signals by scanning the measuring graduation;
   a signal processor unit configured to process the scanning signals into position signals;
   a modification unit;
   a monitor unit configured to monitor at least one signal to be monitored and configured to output a modification signal to the modification unit based on monitoring the signal to be monitored;
   subsequent electronics;
   wherein the modification unit is configured to modify at least one of the position signals, which is supplied to the modification unit, for transmission of at least one status report and to output the modified position signal as an output signal to the subsequent electronics, the modification unit being configured to modify the position signal by adding a disturbance variable to the position signal.

2. The position measuring device according to claim 1, wherein the disturbance variable includes an offset voltage (a), and the addition includes adding the offset voltage to the position signal.

3. The position measuring device according to claim 1, wherein the disturbance variable includes a phase position, and the addition includes shifting one of the position signals by an error angle.

4. The position measuring device according to claim 1, wherein the signal processor unit is configured to generate at least one differential position signal pair based on a respective pair of position signals, the modification unit being configured to add the disturbance variable equally to both signals of the differential position signal pair.

5. The position measuring device according to claim 4, wherein the disturbance variable includes an offset voltage.

6. The position measuring device according to claim 1, wherein the monitor unit is configured to output a test signal to a unit to be monitored.

7. A method for outputting a status report using a position measuring device that includes: a graduation carrier on which a measuring graduation is provided; a scanner unit configured to generate position-dependent scanning signals by scanning the measuring graduation; and a signal processor unit configured to process the scanning signals into position signals, comprising:
   supplying to a monitor unit at least one signal to be monitored;
   outputting, by the monitor unit, a modification signal to a modification unit based on monitoring the signal to be monitored;
   supplying at least one position signal to the modification unit; and
   modifying, by the modification unit, the position signal for transmission of at least one status report and outputting the modified position signal as an output signal to a subsequent electronics;
   wherein the modifying includes adding a disturbance variable based on the modification signal.

8. The method according to claim 7, wherein the disturbance variable includes an offset voltage added to the position signal by an addition.

9. The method according to claim 7, wherein the disturbance variable includes a phase position, and the addition includes shifting one of the position signals by an error angle.

10. The method according to claim 7, further comprising generating, by the signal processor unit, at least one differential position signal pair based on a respective pair of position signals, wherein the modifying includes adding the disturbance variable equally to both signals of the differential position signal pair.

11. The method according to claim 10, wherein the disturbance variable includes an offset voltage.

12. The method according to claim 7, further comprising outputting, by the monitor unit, a test signal to a unit to be monitored.

13. The method according to claim 7, further comprising transmitting the status report as a data word having a number of bits that are encoded by the addition or non-addition of an offset voltage.

* * * * *